(12) United States Patent
Medvinsky

(10) Patent No.: US 10,257,198 B2
(45) Date of Patent: Apr. 9, 2019

(54) PASSWORD INPUT METHOD FOR DEVICES WITH LIMITED USER INTERFACE

(71) Applicant: ARRIS Enterprises LLC, Suwanee, GA (US)

(72) Inventor: Alexander Medvinsky, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 235 days.

(21) Appl. No.: 15/263,070

(22) Filed: Sep. 12, 2016

(65) Prior Publication Data

US 2017/0078294 A1     Mar. 16, 2017

Related U.S. Application Data

(60) Provisional application No. 62/217,083, filed on Sep. 11, 2015.

(51) Int. Cl.
    *G07C 9/00* (2006.01)
    *H04L 29/06* (2006.01)
(52) U.S. Cl.
    CPC .......... *H04L 63/10* (2013.01); *G07C 9/00698* (2013.01); *H04L 63/083* (2013.01)
(58) Field of Classification Search
    CPC ..................................................... H04L 63/10
    See application file for complete search history.

(56) References Cited

U.S. PATENT DOCUMENTS

| | | | | |
|---|---|---|---|---|
| 2007/0250923 | A1* | 10/2007 | M'Raihi | G06F 21/34 726/18 |
| 2010/0122091 | A1* | 5/2010 | Huang | H04L 63/067 713/171 |
| 2015/0097689 | A1* | 4/2015 | Logue | H04W 4/70 340/632 |
| 2015/0135289 | A1* | 5/2015 | Hosabettu | G06F 21/46 726/6 |
| 2017/0169198 | A1* | 6/2017 | Nichols | G06F 21/31 |

FOREIGN PATENT DOCUMENTS

WO   WO2011076764   *   6/2011   ............ G06F 21/20

* cited by examiner

*Primary Examiner* — Kambiz Zand
*Assistant Examiner* — Thanh H Le
(74) *Attorney, Agent, or Firm* — Thomas A. Ward

(57) ABSTRACT

A system is provided wherein a network control access device that is already in a network, called a Gatekeeper, generates a random short password in the form of a series of audio or visual cues that are visible to the user of a joining device. The joining device can be a simple one button device, or even a no-button device that is part of the internet of things (IOT) standard. The response to each cue can be entered by the user on a single-button joining device. For a no-button joining device, an alternate input method may be utilized on the joining device in response to the audio and visual cues. Alternatively, a password can be generated by the no-button joining device and be entered by the user one bit at-a-time directly onto the Gatekeeper keypad. Once the password is received, the Gatekeeper performs a password verification procedure.

19 Claims, 4 Drawing Sheets

PASSWORD INPUT METHOD FOR DEVICES WITH LIMITED USER INTERFACE

CROSS REFERENCE TO RELATED APPLICATION

This Application claims priority under 35 U.S.C. § 119(e) from earlier filed U.S. Provisional Application Ser. No. 62/217,083 filed on Sep. 11, 2015 and incorporated herein by reference in its entirety.

BACKGROUND

Technical Field

The present invention relates to the provisioning of passwords for a device to join or register with a network. More particularly, the present invention relates to smart devices with limited user inputs which can be part of the Internet of Things (IOT), and how the smart devices can join a network using a password.

Related Art

Some home network security standards such as Thread define a method to provision a device into a user's network based on a password. Some IOT devices have a very limited user interface, such as a smoke detector. Such devices may only have a single button, or even no button interface that can be used to provide a password to access a network.

With some IOT devices having a very limited user interface, such as one button, for the device to be configured to connect to a network, the Thread standard has proposed that a password be printed on a label for the device. This may present a privacy issue since the password printed on a label is easily discoverable. If that password is exposed to a hostile party, that party can set up a fake Gatekeeper to provision an IOT device with a hostile network that would take over control of that device. Exposure can occur when a hostile party has physical access to the device or it could be due to device manufacturer's error which exposes their whole database of IOT device passwords. Or perhaps a device manufacturer chooses a poor method of generating such passwords and they can be easily recreated.

It is desirable to provide further means to provide a password for a device in lieu of providing a printed label, and to make that password as secure as possible. It is further desirable to give the user of a device full control of that password and allow the user to change it whenever the user wishes. Finally, it is desirable to provision devices with a password in this manner, even for devices having a limited user interface, such as a single button or no user input.

SUMMARY

According to embodiments of the present invention, a system is provided wherein a network control access device that is already in a network, called a Gatekeeper, generates a random short password, for example 16 binary bits, optionally displays the password to a user, and then the user enters this password into a joining device one bit at-a-time based on a series of audio or visual cues. The audio or visual cues can be provided from the Gatekeeper and the response to each cue entered by the user on a single-button joining device. For a no-button joining device, the audio and visual cues can be provided from the joining device that are detected by the Gatekeeper, or alternatively a password can be generated by the no-button joining device and be entered by the user one bit at-a-time directly onto the Gatekeeper keypad. Once the password is received, the Gatekeeper performs a password verification procedure which for example can be the Password Authenticated Key Exchange by Juggling (JPAKE) authenticated protocol. Another similar protocol that could be used is the Elliptic Curve WAKE, (EC-JPAKE).

For the system to function, the following assumptions can apply. First, with the system provided with simple IOT devices to connect with security established, the system further includes network connection components including a Network Key and Gatekeeper devices. The Gatekeeper is a device in the IOT network which is responsible for admitting and registering new devices with the network and providing them with a shared Network Key. The Network Key is used to encrypt and/or authenticate all digital data exchanges on this IOT network. Second, the user that wishes to connect a joining device must be physically in the near proximity of both the Gatekeeper and the joining device. The user is, thus, close enough to notice visual and audio cues from the Gatekeeper and at the same time enter a response to each cue on the joining device (e.g., using 1 button). Alternatively, the user is close enough to notice visual and audio cues from the joining device and at the same time enters a response to each cue on the Gatekeeper. After the password is available on both the joining device and the Gatekeeper, the Gatekeeper performs password verification after which the joining device is able to access the network.

When the user requests to connect a joining device, the Gatekeeper device determines the provisioning password for a new IOT device that wants to join the network. The password could be reused for multiple joining devices, but preferably it is randomly generated every time a new device wants to join. A small password can be utilized for one-time use (e.g., 4 decimal digits), since a new password is generated each time a device wants to join an IOT network. In one embodiment, one such short password is utilized only for one provisioning sequence. The password is converted to a binary representation, or a sequence of bits. A decimal digit can be represented by 4 bits so for example the password will consist of 16 bits in total.

The Gatekeeper proceeds to provide the user with visual and/or audio cues for each bit. Whenever a bit is 0, there is no cue at all and it appears to the user as a pause. Whenever a bit is a 1, Gatekeeper will create either a visual or an audio cue for a user to press a button on the joining device. The user will have a limited amount of time to push a button but long enough so that user mistakes are infrequent. Once the series of bits had been entered, the joining device should have the full password and should be able to proceed with the authentication and key exchange protocol such as EC-JPAKE. Eventually, the joining device will be provisioned with the Network Key and will be fully provisioned for the user's IOT network.

Embodiments of the present invention that allow password provisioning to an IOT network using such cues from a Gatekeeper can provide the user additional peace of mind, addressing concerns on whether or not the password that is printed on a product label is sufficiently confidential.

If authentication fails because the user made a mistake pressing the buttons, the Gatekeeper would generate a brand new password and the user can retry again but with another password. Once joining of the user's network is blocked because the user enters the wrong password a number of times, the password can only be reset by the owner of that network by typing in an administrative command on the Gatekeeper device to remove the block. That user would know if the network is locked out due to that user's own mistake or if someone from outside is really trying to break in.

One attack that needs to be prevented is a next door neighbor or person in the parking lot within wireless network's range to keep guessing the password until their unauthorized device joins your IOT network. This could happen because the password may be short. But such an attack can be prevented by limiting the number of retries. After the limit on retries is exceeded, the Gatekeeper device of the IOT network can suspend and block joining of this network by any device. It may not be sufficient to block only one specific device ID since an attacker can keep retrying with random new devices.

Additional security can be provided by having the user to confirm on the Gatekeeper device that the joining device with a particular MAC Address is allowed to join the network. As an alternative to a MAC address, another device identifier such as a serial number or an IP address could likewise be used. This can only be done by the user that is in physical proximity of the Gatekeeper device, not by the next door neighbor or someone in the parking lot who doesn't have physical access to the user's premises. This additional precaution can be optionally enabled or disabled by the user.

Devices such as a laptop or a smartphone would simply allow the user to enter a full password, taking advantage of a rich user interface. However, devices such as a door lock, light bulb, or a smoke detector are now also becoming networked but lack a reasonable user interface. Such devices may for example only have a single button, like on a smoke detector, and can connect according to embodiments of the present invention. Some devices, however, may not have a button, like the light bulb or door lock, so embodiments of the present invention allow for another input method to provide each bit of the password. For example a button press can be replaced by connecting and disconnecting the light bulb, or locking and unlocking the door lock to provide each bit of a password. Alternatively for a no-button joining device, a user can enter the password one bit at-a-time on the Gatekeeper device keypad based on the audio or visual cues from the joining device that generates the password itself

BRIEF DESCRIPTION OF THE DRAWINGS

Further details of the present invention are explained with the help of the attached drawings in which.

DETAILED DESCRIPTION

Figure 1:
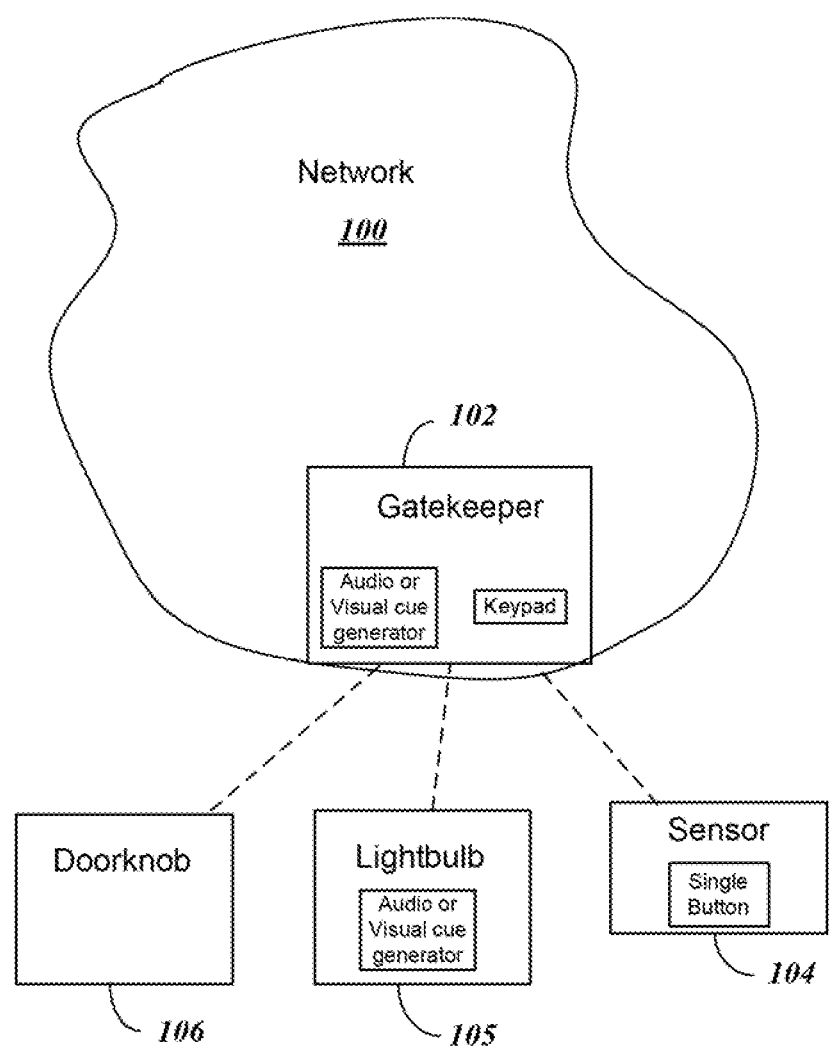
FIG. 1 illustrates a system according to the present invention with a gatekeeper controlling access of joining devices to a network.

FIG. 1 illustrates a system according to embodiments of the present invention with a gatekeeper controlling access for devices joining a network. The system includes a gatekeeper 102 that has an audio or visual cue port and a keypad. The gatekeeper 102 controls password access of joining devices such as 104-106 onto a network 100. The audio or visual cue port of the gatekeeper 102 provides signals to indicate a password to a user to enable connection of a joining device. For devices with no keys or other access for a user to provide a password, the gatekeeper device can include a keypad to allow the user to type in a password identifying the joining device based on the audio or visual cues from the joining device based on the password it randomly generated. The joining devices shown include a sensor 104, such as a smoke detector, that has a single button to allow a user to enter passwords that can be detected by the gatekeeper. The joining devices shown also include a lightbulb 105 or a doorknob 106 that may have no button, and these devices can still access the system through the gatekeeper 102 using steps according to embodiments of the present invention described to follow. One way of connecting is shown with the lightbulb 105 that includes a audio or visual cue generator to generate its own password for a user to see and type into the keypad of gatekeeper 102. Another way of connecting illustrated by doorknob 106 that has no audio or visual cue generator and no button, is to provide another password input method that can be detected by the gatekeeper such as by locking and unlocking. The devices 104-106 can comply with the IOT standard, or may be simple devices that do not include a full keypad to enable password entry that can still have password access through the gatekeeper.

The gatekeeper 102, and joining devices 104-106 include a processor and memory and communication components that enable them to communicate to allow password access by the joining devices. The memory stores code that is executable by the processor to enable the processor to operate the communication components to perform the steps described for embodiments of the present invention.

Figure 2:
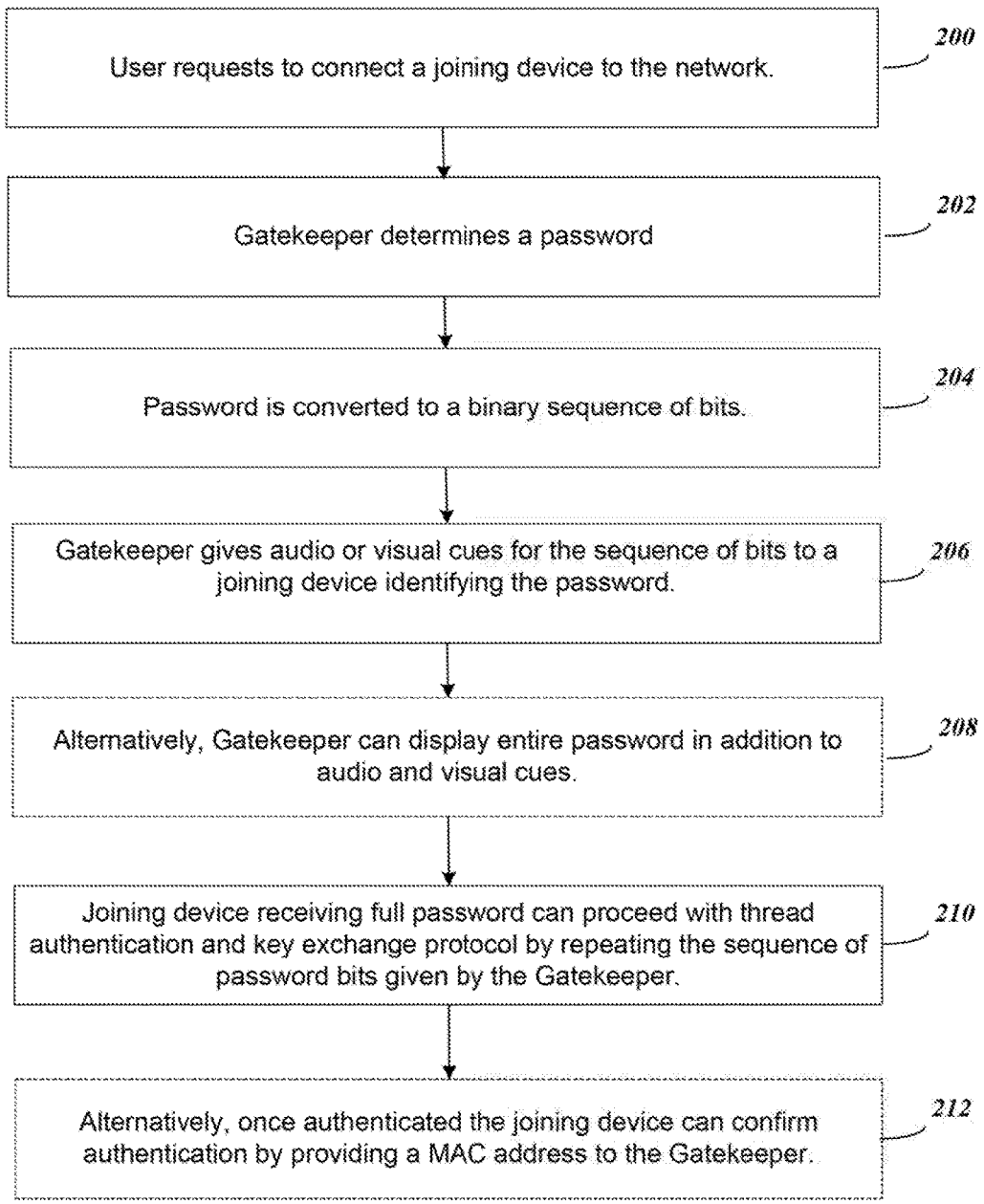
FIG. 2 is a flowchart illustrating steps for a joining device to provide a password to a gatekeeper to enable the joining device to access the network.

FIG. 2 is a flowchart illustrating steps for one of the joining devices 104-106 to provide a password to a gatekeeper to enable the joining device to access the network. In a first step 200, a user requests to connect a joining device to the network. In response in step 202 the gatekeeper device determines the provisioning password for a new IOT device, or similar device that wants to join the network. The password could be reused for multiple joining devices, but preferably it is randomly generated every time a new device wants to join. A small password can be utilized for one-time use (e.g., 4 decimal digits), since a new password is generated each time a device wants to join an IOT network. In one embodiment, one such short password is utilized only for one provisioning sequence. In step 204, the password is converted to a binary representation, or a sequence of bits. A decimal digit can be represented by 4 bits so for example the password will consist of 16 bits in total.

Next in step 206, the Gatekeeper proceeds to provide the user with visual and/or audio cues for each bit. In one embodiment, whenever a bit is 0, there is no cue at all and it appears to the user as a pause. Whenever a bit is a 1, the Gatekeeper will create either a visual or an audio cue for a user to press a button on the joining device. The user will have a limited amount of time to push a button in response to the audio or visual cues, but long enough so that user mistakes are infrequent.

In step 208, as an alternative to only giving audio or visual clues like a flash of light or a sound ping, the gatekeeper device in step 206 can also display the entire password. The dashed lines of step 206 in FIG. 2, or other steps subsequently, illustrate that the step may be optionally included in the system.

In step 210, once the series of bits had been entered, the joining device should have the full password received and repeated back to the gatekeeper. The password entry can proceed in this manner, or other manner with the authentication and key exchange protocol such as EC-JPAKE. Eventually, the joining device will be provisioned with the Network Key and will be fully provisioned for the user's IOT or other similar network.

In an alternative step 212, additional security can be provided by having the user confirm on the Gatekeeper device that the joining device with a particular MAC Address is allowed to join the network. This can only be done by the user that is in physical proximity of the Gatekeeper device, but not by the next door neighbor or someone in the parking lot who doesn't have physical access to the user's premises. In some embodiments, this additional precaution can be optionally enabled or disabled by the user.

Embodiments of the present invention that allow password provisioning to an IOT network using such cues from a Gatekeeper can provide the user additional peace of mind, addressing concerns on whether or not the password that is printed on a product label is sufficiently confidential, so that the product label is not necessary.

Figure 3:
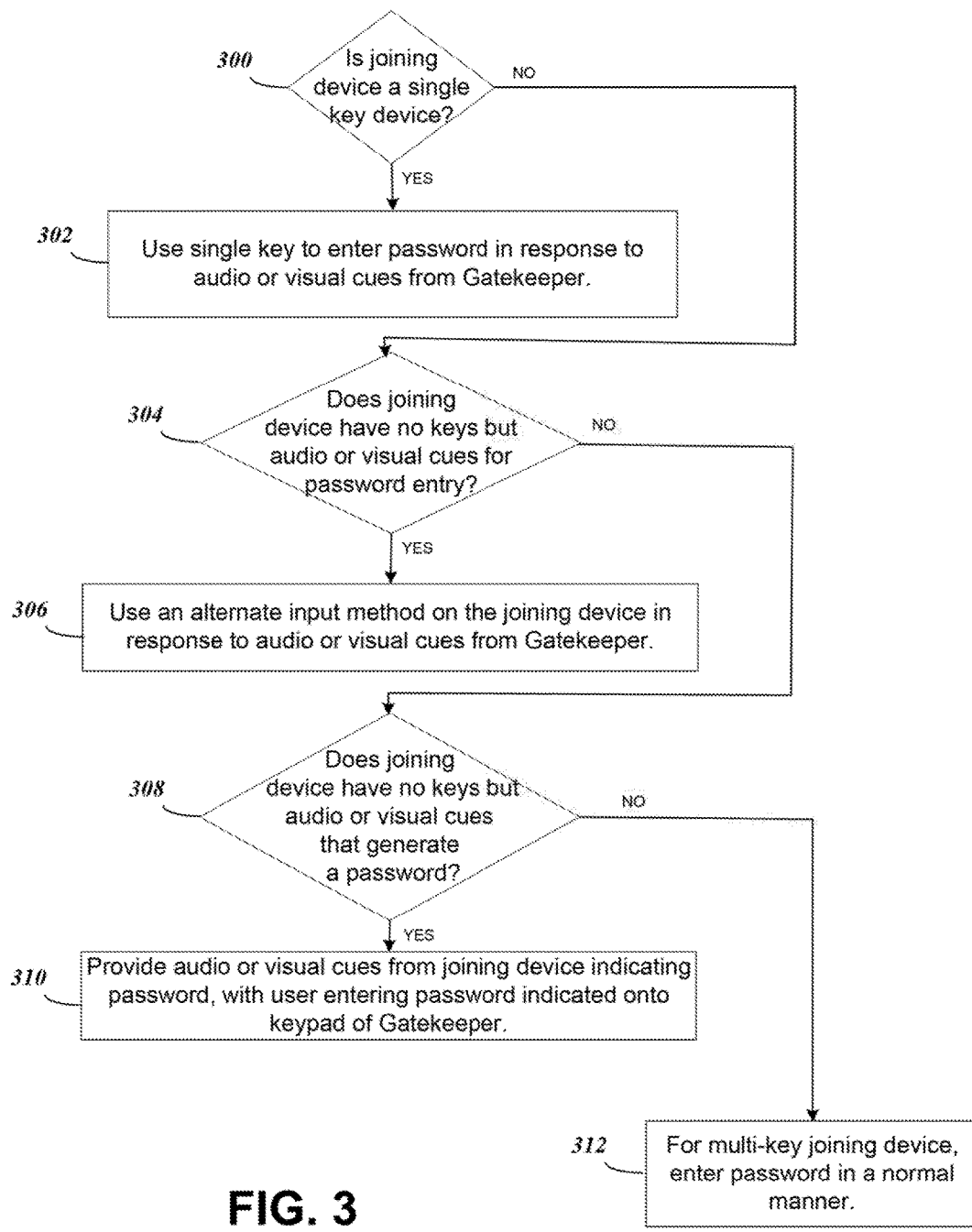
FIG. 3 is a flowchart that illustrates steps for authenticating joining devices that alternatively have a single key, no key or multiple keys to enter a password to join the network.

FIG. 3 is a flowchart that illustrates steps for joining devices that alternatively have a single key, no key or multiple keys to enter a password to join the network. Devices such as a laptop or a smartphone would simply allow the user to enter a full password, taking advantage of a rich user interface. However, devices such as the doorknob 106, light bulb 105, or sensor like a smoke detector 104 are now also becoming networked but lack a reasonable user interface. FIG. 3 provides steps to enable all these devices to access the system.

In step 300, the system first considers devices that have a single key for entry of the password. If the device is single key, in step 302 the single key can be used to enter the password in response to audio or visual cues from the gatekeeper. In a next determination step 304, if the device has no keys for password entry, but has an alternate method to enter bits of a password, the system authenticates by proceeding to step 306. For example the input method can be connecting and disconnecting the light bulb, or locking and unlocking the door lock to provide bits of a password. In step 306, use an alternate input method on the joining device in response to each audio or visual cue from Gatekeeper. In another alternative configuration in step 308, if the device has no keys and cannot provide visual cues to a gatekeeper, the system can still authenticate by proceeding to step 310. In step 310, the system allows the joining device itself to provide visual or audio cues to create a password. A user seeing those cues then enters the password into a keypad on the gatekeeper device for authentication. Once connected, the gatekeeper and device can take further steps to ensure that authentication is proper. If the final alternative, if the joining device has a keypad, in step 312 the authentication proceeds with a user using the keypad to provide the password to the gatekeeper in a conventional fashion.

Figure 4:
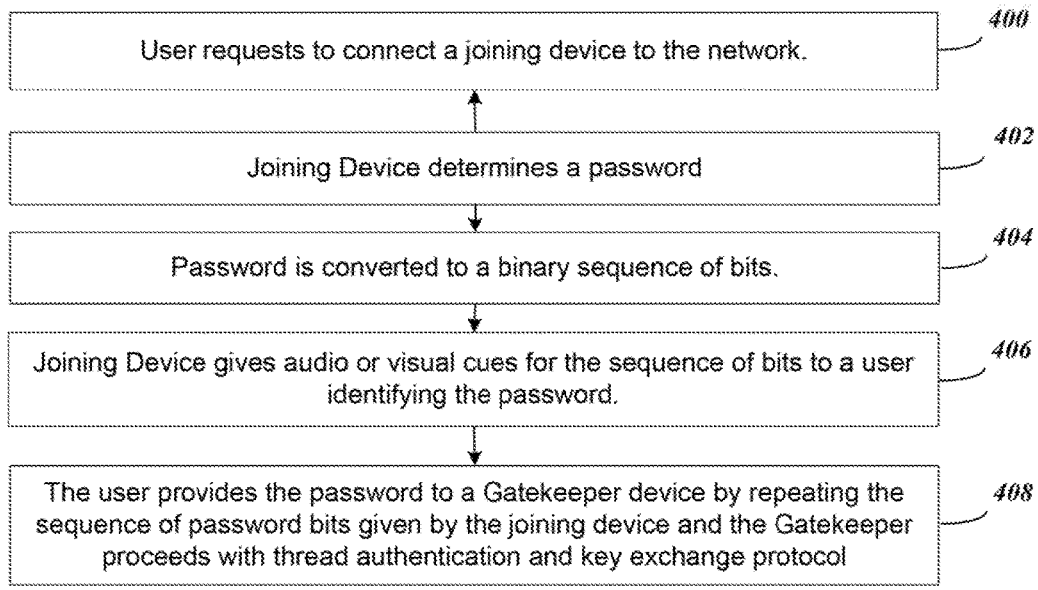
FIG. 4 is a flowchart illustrating steps for connecting a joining device as indicated in FIG. 3 that has no key for password entry, but includes an audio or visual cue generator and can generate its own password.

FIG. 4 is a flowchart illustrating steps for connecting a joining device as indicated at step 310 in FIG. 3 that has no key for password entry, but includes an audio or visual cue generator and can generate its own password. In a first step 400, a user requests to connect a joining device to the network. This can be done by the user accessing the Gatekeeper device using its user interface and sending a message to the joining device to begin the "network join" procedure. Alternatively, the user can request access for the joining device using a keypad on the network. In step 402, when prompted by the user or the Gatekeeper, the joining device generates its own password that can be recognized by the Gatekeeper in an authentication procedure. In step 404, the joining device converts the password to a sequence of binary bits. Next, in step 406, the joining device gives audio or visual cues from a generator of such cues on the device for the sequence of bits to a user identifying the password. Finally, in step 408, the user provides the password to the Gatekeeper device by repeating the sequence of password bits given by the joining device and the Gatekeeper and joining device proceed with an authentication and a key exchange protocol.

Figure 5:
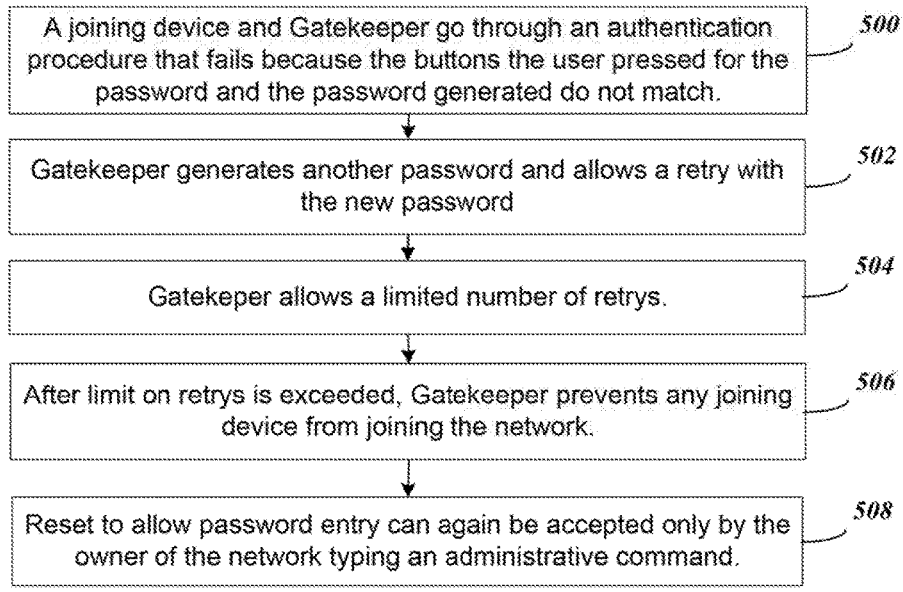
FIG. 5 is a flowchart illustrating steps for accessing the system when a user enters an incorrect password.

FIG. 5 is a flowchart illustrating steps for accessing the system after a user enters an incorrect password on a 1-button joining device based on audio or visual cues from the Gatekeeper based on a password it generated. Alternatively, the incorrect password is entered on the Gatekeeper in response to audio or visual cues generated by the joining device based on a password it generated. In step 500, the joining device and Gatekeeper go through an authentication protocol, which could be EC-JPAKE, and authentication fails because a user has entered an incorrect sequence of button presses on the joining device and the passwords on the two devices do not match. In step 502, the Gatekeeper would generate a brand new password and the user can retry entry but with another password. In step 504, the user is allowed a limited number of tries, and in step 506 once the limit is exceeded, the gatekeeper prevents the joining device from accessing the network. In step 508, once joining of the user's network is blocked because the user enters the wrong password a number of times, the password can only be reset by the owner of that network by typing in an administrative command on the Gatekeeper device to remove the block. That administrative user would supposedly know if the network is locked out due to that user's own mistake or if someone from outside is really trying to break in.

One attack that needs to be prevented is a next door neighbor or person in the parking lot within wireless network's range to keep guessing the password until their unauthorized device joins your IOT network. This could happen because the password may be short. But such an attack can be prevented by limiting the number of retries. After the limit on retries is exceeded, the Gatekeeper device of the IOT network can suspend and block joining of this network by any device. It may not be sufficient to block only one specific device ID since an attacker can keep retrying with random new devices.

Although the present invention has been described above with particularity, this was merely to teach one of ordinary skill in the art how to make and use the invention. Many additional modifications will fall within the scope of the invention as that scope is defined by the following claims.

What is claimed:

1. A method for providing secure access of a joining device into a system comprising:
   providing a random number from the system, the random number providing a password generated by the system to allow a joining device to access the system to enable the joining device to join a network;
   providing to a user a series of sound pings or light flashes from the system that matches the password generated by the system;

receiving from the joining device a response to the series of sound pings or light flashes entered by the user accessing a single physical access point of the joining device; and determining by the system when the user has correctly provided the response to the joining device, wherein when the response matches the password generated by the system, allowing the joining device access to the system.

2. The method of claim 1, wherein the single physical access point on the device is a button.

3. The method of claim 2, wherein to produce a response to each sound ping or light flash, the user will have a limited amount of time to press the button.

4. The method of claim 2, wherein the user enters bits for the password to the user device by pressing the button for each or either a 1-bit or a 0-bit and pausing for the other of the 1-bit or the 0-bit.

5. The method of claim 4, wherein the system provides the sound pings or light flashes to the user to signal a start of each successive bit of the password.

6. The method of claim 1, wherein the system determines that the response matches the password generated by the system by utilizing an authenticated key exchange protocol with the joining device.

7. The method of claim 1, wherein the password only allows a single device to access the system.

8. The method of claim 1, wherein the password can be used by multiple devices to access the system.

9. The method of claim 1, wherein the joining device provides a device identifier to the system for further authentication after acceptance of password.

10. The method of claim 1, wherein the system is a single Gatekeeper device that controls access to the network.

11. The method of claim 1, wherein when the user gets a limited number of retries to get the password correct, and after the limited number of retries the system suspends and blocks joining of the network by the joining device and all other joining devices.

12. The method of claim 11, wherein to enable further password entry to the system an administrative code must be entered to the system.

13. The method of claim 1, wherein the joining device comprises at least one of a sensor device, light bulb or a door lock.

14. The method of claim 13, wherein the input method for each bit of a password for the light bulb comprises connecting and disconnecting the light bulb to a power source so the light bulb turns on and off, wherein the password input method for the sensor device comprises pushing a button on the sensor, and wherein the input method for each bit of a password for the door lock comprises engaging and disengaging the door lock to make an audible sound.

15. A method for providing secure access of a joining device into a system comprising:

providing a random number from the joining device, the random number providing a password generated by the joining device for the purpose to enable the device to join a network, where the joining device has no user-provided input capability;

converting by the joining device the password to a sequence of binary 0 or 1 bits;

converting by the joining device each bit of the password to sound pings or light flashes;

providing to a user from the joining device the series of sound pings or light flashes to enable the user to provide an input to the system using a physical access point comprising a button as a response to each sound ping or light flash; and indicating verification by the system that the user input matches the password generated by the joining device by allowing the device to access the system.

16. The method of claim 15, wherein the system determines that the response matches the password generated by the system by utilizing an authenticated key exchange protocol with the joining device.

17. The method of claim 15, wherein the user enters bits for the password to the system by pressing the button for each or either a 1-bit or a 0-bit and pausing for the other of the 1-bit or the 0-bit.

18. The method of claim 17, wherein the joining device provides the sound pings or light flashes to the user to signal a start of each successive bit of the password.

19. The method of claim 15, wherein the system is a single Gatekeeper device that controls access to the network.

* * * * *